United States Patent
Tylenda

(10) Patent No.: US 11,030,231 B2
(45) Date of Patent: Jun. 8, 2021

(54) ANGULAR K-MEANS FOR TEXT MINING

(71) Applicant: Intel Corporation, Santa Clara, CA (US)

(72) Inventor: Piotr Tylenda, Lysomice (PL)

(73) Assignee: Intel Corporation, Santa Clara, CA (US)

( * ) Notice: Subject to any disclaimer, the term of this patent is extended or adjusted under 35 U.S.C. 154(b) by 588 days.

(21) Appl. No.: 15/699,236

(22) Filed: Sep. 8, 2017

(65) Prior Publication Data

US 2019/0080001 A1    Mar. 14, 2019

(51) Int. Cl.
*G06F 16/30*  (2019.01)
*G06F 16/35*  (2019.01)
*G06F 16/93*  (2019.01)

(52) U.S. Cl.
CPC .......... *G06F 16/353* (2019.01); *G06F 16/355* (2019.01); *G06F 16/93* (2019.01); *G06F 2216/03* (2013.01)

(58) Field of Classification Search
CPC .... G06F 2216/03; G06F 16/93; G06F 16/353; G06F 16/355
USPC .......................................................... 707/776
See application file for complete search history.

(56) References Cited

U.S. PATENT DOCUMENTS

| | | | |
|---|---|---|---|
| 2007/0214186 A1* | 9/2007 | Yang | G06K 9/6282 |
| 2009/0146189 A1* | 6/2009 | Madurawe | G11C 5/063 257/203 |
| 2014/0203175 A1* | 7/2014 | Kobrinsky | G02B 6/428 250/214.1 |

OTHER PUBLICATIONS

Hauser et al.: "Statistical Analysis of Catalogs of Extragalactic Objects. II. The Abell Catalog of Rich Clusters", The Astrophysical Journal, 185:757-785, Nov. 1, 1973 (Year: 1973).*
Charles Elkan: "Using the Triangle Inequality to Accelerate k-Means", Department of Computer Science and Engineering University of California, San Diego La Jolla, California 92093-0114 (ICML-2003). (Year: 2003).*
Rezaei et al.: "Set Matching Measures for External Cluster Validity", The Astrophysical Journal, 185:757-785, 2015. (Year: 2015).*
Wikipedia, "Pseudometric space", Wikipedia: The Free Encyclopedia, Jun. 26, 2017, retrieved Aug. 2, 2017, 3 pages.
Charles Elkan, "Using the Triangle Inequality to Accelerate k-Means", Proceedings of the Twentieth International Conference on Machine Learning, Washington DC, 2003, 7 pages.

* cited by examiner

*Primary Examiner* — Kuen S Lu
(74) *Attorney, Agent, or Firm* — Jordan IP Law, LLC

(57) ABSTRACT

An embodiment of a semiconductor package apparatus may include a substrate, and logic coupled to the substrate, wherein the logic is at least partly implemented in one or more of configurable logic and fixed-functionality hardware logic, the logic coupled to the substrate to determine an angular distance between a data object and a group of data objects, and assign the data object to the group of data objects based on the determined angular distance. In some embodiments, the logic may also be to determine one or more of an upper bound and a lower bound for the group of data objects based on triangle inequality. Other embodiments are disclosed and claimed.

16 Claims, 8 Drawing Sheets

ANGULAR K-MEANS FOR TEXT MINING

TECHNICAL FIELD

Embodiments generally relate to dataset processing. More particularly, embodiments relate to an angular k-means technique for text mining.

BACKGROUND

In the field of data mining, a k-means technique may refer to a process for grouping data into k clusters. A standard k-means technique may group the data based on a Euclidean distance between data points. A spherical k-means technique may group the data based on a cosine similarity between data points.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
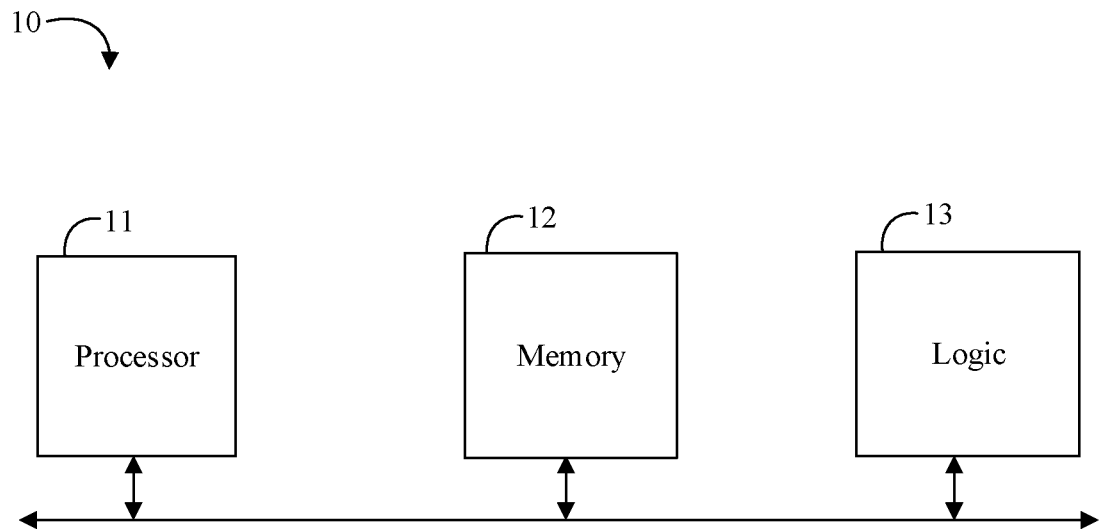
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and logic 13 communicatively coupled to the processor 11 to determine an angular distance between a data object and a group of data objects, and assign the data object to the group of data objects based on the determined angular distance. For example, the logic 13 may determine one or more of an upper bound and a lower bound for the group of data objects based on triangle inequality. In some embodiments, the logic 13 may be further configured to determine if the data object is within the upper and lower bounds for the group of data objects, and determine the angular distance between the data object and the group of data objects responsive to the data object being determined to be within the upper and lower bounds for the group of data objects. The logic 13 may also maintain a k by k matrix of distances between respective groups of data objects, where k corresponds to a target number of groups of data objects. In some embodiments, the logic 13 may also maintain a n by k matrix of respective lower bounds for each data object and each group of data objects, and maintain an array of size n of respective upper bounds for each data object, where n corresponds to a total number of data objects in a dataset and where k corresponds to a target number of groups of data objects. In any of the embodiments herein, the dataset may include a set of text documents.

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C # or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, determining an angular distance between a data object and a group of data objects, assigning the data object to the group of data objects based on the determined angular distance, etc.).

Figure 2:
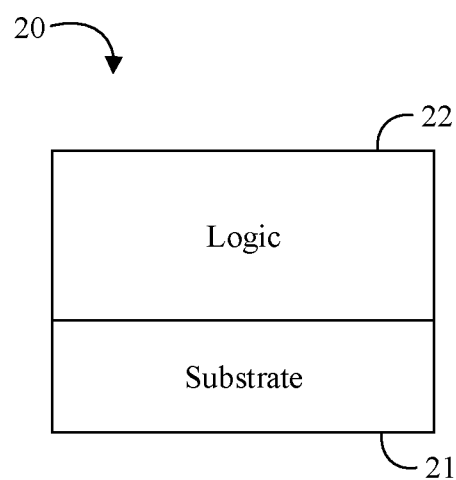
FIG. 2 is a block diagram of an example of a semiconductor package apparatus according to an embodiment.

Turning now to FIG. 2, an embodiment of a semiconductor package apparatus 20 may include a substrate 21, and logic 22 coupled to the substrate 21, wherein the logic 22 is at least partly implemented in one or more of configurable logic and fixed-functionality hardware logic. The logic 22 coupled to the substrate may be configured to determine an angular distance between a data object and a group of data objects, and assign the data object to the group of data objects based on the determined angular distance. For example, the logic 22 may determine one or more of an upper bound and a lower bound for the group of data objects based on triangle inequality. In some embodiments, the logic 22 may be further configured to determine if the data object is within the upper and lower bounds for the group of data objects, and determine the angular distance between the data object and the group of data objects responsive to the data object being determined to be within the upper and lower bounds for the group of data objects. The logic 22 may also maintain a k by k matrix of distances between respective groups of data objects, where k corresponds to a target number of groups of data objects. In some embodiments, the logic 22 may also maintain a n by k matrix of respective lower bounds for each data object and each group of data objects, and maintain an array of size n of respective upper bounds for each data object, where n corresponds to a total number of data objects in a dataset and where k corresponds to a target number of groups of data objects. In any of the embodiments herein, the dataset may include a set of text documents.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

Figure 3A:
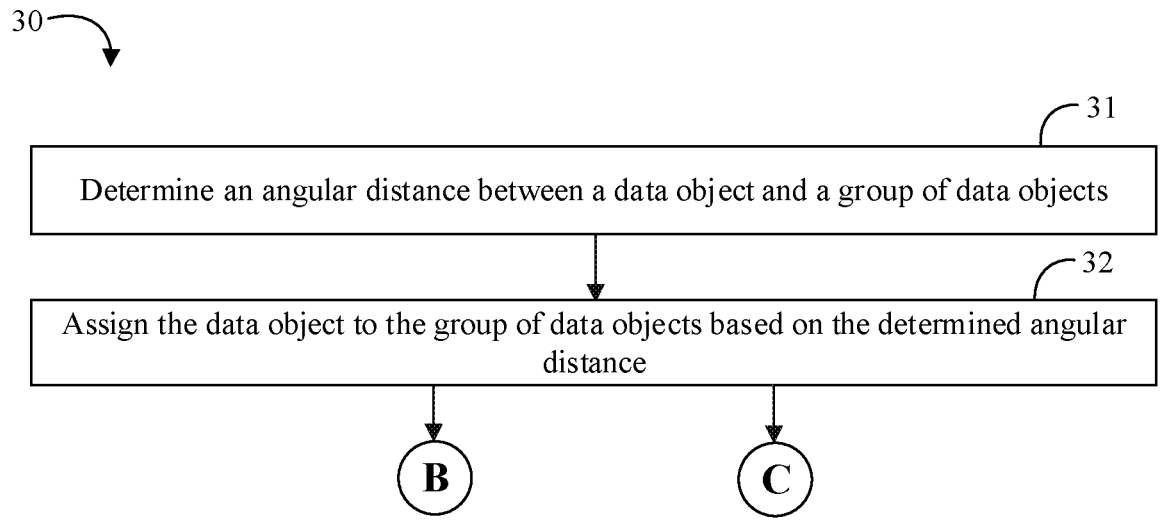
FIGS. 3A to 3C are flowcharts of an example of a method of grouping data objects according to an embodiment.
Figure 3B:
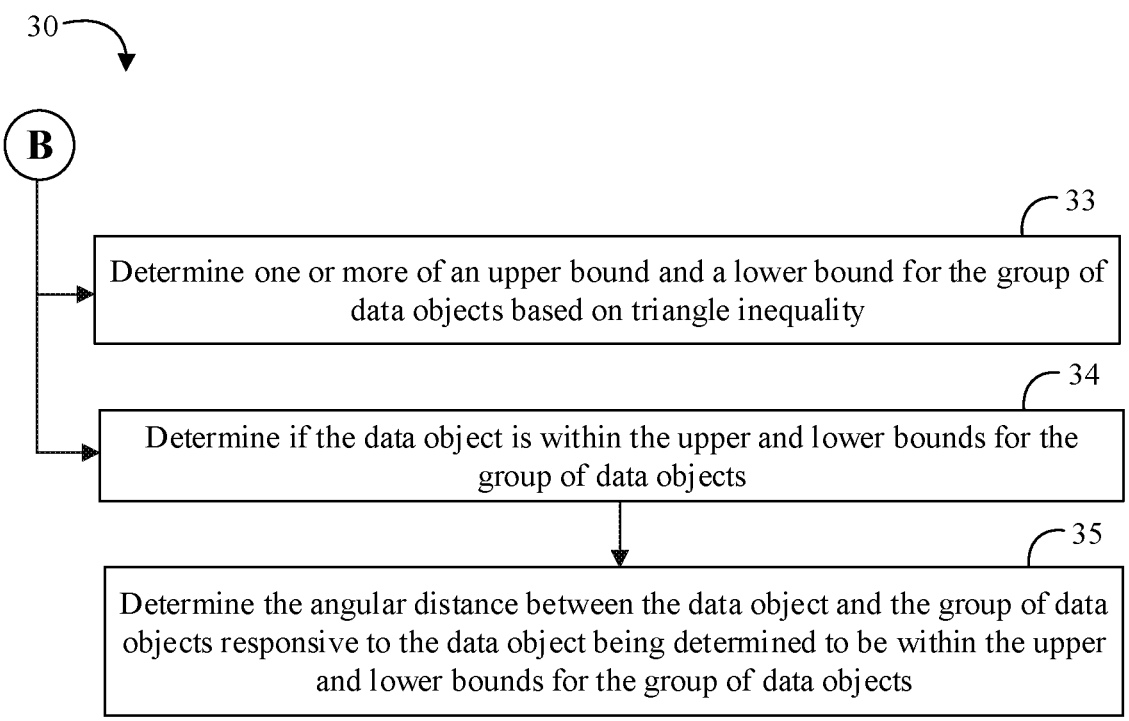
Figure 3C:
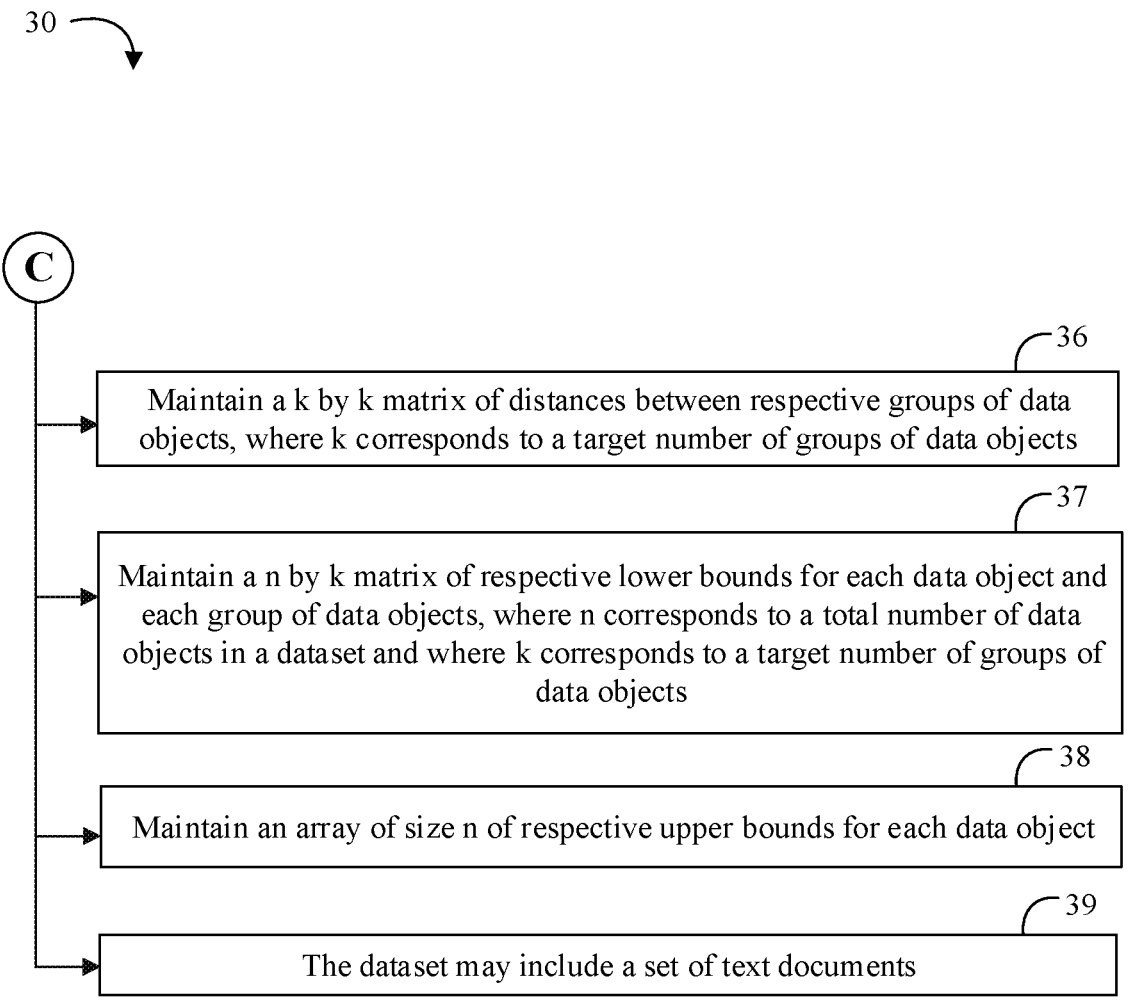

Turning now to FIGS. 3A to 3C, an embodiment of a method 30 of grouping data objects may include determining an angular distance between a data object and a group of data objects at block 31, and assigning the data object to the group of data objects based on the determined angular distance at block 32. For example, the method 30 may include determining one or more of an upper bound and a lower bound for the group of data objects based on triangle inequality at block 33. Some embodiments may include determining if the data object is within the upper and lower bounds for the group of data objects at block 34, and determining the angular distance between the data object and the group of data objects responsive to the data object being determined to be within the upper and lower bounds for the group of data objects at block 35. The method 30 may also include maintaining a k by k matrix of distances between respective groups of data objects, where k corresponds to a target number of groups of data objects at block 36, maintaining a n by k matrix of respective lower bounds for each data object and each group of data objects, where n corresponds to a total number of data objects in a dataset and where k corresponds to a target number of groups of data objects at block 37, and/or maintaining an array of size n of respective upper bounds for each data object block 38. For example, the dataset may include a set of text documents at block 39.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

For example, the method 30 may be implemented on a computer readable medium as described in connection with Examples 19 to 24 below. Embodiments or portions of the method 30 may be implemented in applications (e.g., through an application programming interface (API)) or driver software running on an operating system (OS).

Figure 4:
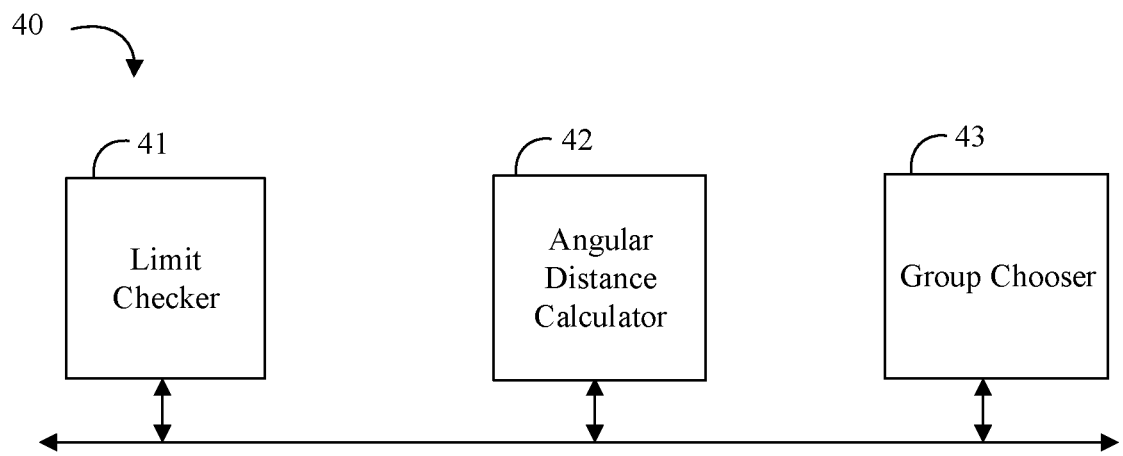
FIG. 4 is a block diagram of an example of a data grouper according to an embodiment.

Turning now to FIG. 4, some embodiments may be logically or physically arranged as one or more modules. For example, an embodiment of a data grouper 40 may include a limit checker 41 communicatively coupled to an angular distance calculator 42, and a group chooser 43. The angular distance calculator 42 may be configured to calculate an angular distance between a data object and a group of data objects. The limit checker 41 may be configured to determine one or more of an upper bound and a lower bound for the group of data objects based on triangle inequality. The limit checker 41 may also be configured to determine if the data object is within the upper and lower bounds for the group of data objects, and advantageously avoid redundant or unnecessary calculations (e.g., the angular distance calculator 42 may calculate the angular distance between the data object and the group of data objects responsive to the data object being determined by the limit checker 41 to be within the upper and lower bounds for the group of data objects). The group chooser 43 may assign the data object to an appropriate group of data objects based on the determined angular distance. The data grouper 40 may also maintain a k by k matrix of distances between respective groups of data objects, where k corresponds to a target number of groups of data objects. In some embodiments, the data grouper 40 may also maintain a n by k matrix of respective lower bounds for each data object and each group of data objects, and maintain an array of size n of respective upper bounds for each data object, where n corresponds to a total number of data objects in a dataset and where k corresponds to a target number of groups of data objects. For example, the dataset may include a set of text documents and the data objects may be individual text documents.

Embodiments of the limit checker 41, the angular distance calculator 42, the group chooser 43, and other components of the data grouper 40, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

Advantageously, some embodiments may provide an angular k-means technique for text mining with boosted convergence improvements or optimizations. Some embodiments may be particularly useful for cluster analysis, clustering, data mining, search engines, text mining, and/or unsupervised learning. Some embodiments may be used in variety of products including code libraries, mining implementations for dedicated hardware, or any big data applications which aim at text recognition and/or text analysis (e.g., analysis of test execution logs for system validation).

Various k-means techniques may be useful for data mining in the field of unsupervised learning and/or clustering. Spherical k-means is a variation of standard k-means algorithm which uses cosine similarity instead of Euclidean distance as a distance function between clustered objects. The spherical k-means variation may provide good results in clustering of text documents (e.g., text mining). However, a problem with spherical k-means in text mining is that it may require much more computation power and time than, for example, simple grouping of objects in 3D Euclidean space. Without being limited to theory of operation, documents may be represented by large, sparse vectors in n-dimensional space, where n is count of distinct words/terms in all clustered documents (e.g., it can be tens of thousands). The larger the vectors, the longer the computation of distance (cosine similarity) between two documents.

Some embodiments may advantageously use a triangle inequality on an n-dimensional unit-sphere in order to significantly reduce the number of distance computations in what is herein termed as an angular k-means technique. The angular k-means technique may group data points based on an angular distance (e.g., as opposed to the cosine similarity of the spherical k-means technique). Some embodiments may also utilize intermediate data structures, such that the triangle inequality may create a transitive relation which is used in order to reduce or avoid redundant or unnecessary distance computations. Advantageously, some embodiments may converge a few orders of magnitude faster than the spherical k-means technique, while providing similar or identical clustering results. The faster convergence may, in some embodiments, make the angular k-means technique particularly useful for largescale, distributed text mining. Some embodiments of an angular k-means technique may always provide identical clustering results as compared to the spherical k-means technique when the two techniques are initialized exactly the same (e.g., with the same random generator seed). Advantageously, some embodiments of the angular k-means technique may use triangle inequality to provide faster results without sacrificing any precision.

Figure 5:
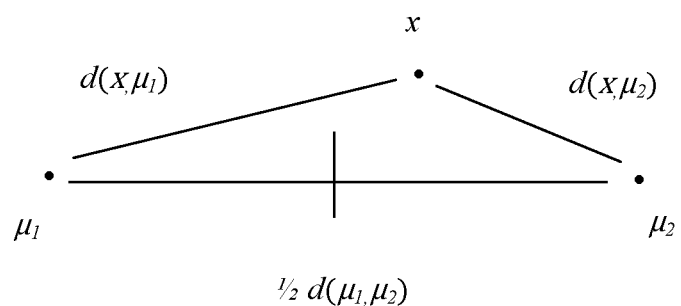
FIG. 5 is an illustrative diagram of an example of principles of triangle inequality between three points according to an embodiment.

Without being limited to theory of operation, some embodiments may be better understood with reference to FIG. 5. For text mining applications, text documents may be represented as points on an n-dimensional unit-sphere, where the angular distance of two points may act a distance function. FIG. 5 shows three such points $\mu_1$, $\mu_2$, and x which define a triangle, where $\mu_1$ may correspond to a first centroid, where $\mu_2$ may correspond to a second centroid, and x corresponds to text document. Triangle inequality indicates that the distance between two points a and b is less than or equal to the sum of the distance between the point a and a third point c plus the distance between the points b and c (e.g., $d(a,b) \leq d(a,c)+d(c,b)$). Accordingly, if a distance $d(x,\mu_1)$ between the point x and the centroid point $\mu_1$ is smaller than (or equal to) half (½) the distance $d(\mu_1, \mu_2)$ between the two centroid points $\mu_1$ and $\mu_2$ then the point x is closer (or at least equally close) to centroid in comparison to centroid $\mu_2$. An upper bound for the angular distance function may be determined based on half of the distance between the two centroids.

Similarly, a lower limit for the angular distance function may be based on triangle inequality. The distance $d(x,\mu_2)$ must be greater than or equal to the bigger of zero and the difference between the distance $d(x,\mu_1)$ and the distance $d(x,\mu_2)$ (e.g., $d(x,\mu_2) \geq \max\{0, d(x,\mu_1)-d(x,\mu_2)\}$). For example, triangle inequality indicates that $d(x,\mu_1) \leq d(x,\mu_2)+d(\mu_1,\mu_2)$ which can be transformed to $d(x,\mu_1)-d(\mu_1,\mu_2) \leq d(x,\mu_2)$, where $d(x,\mu_2) \geq 0$.

The foregoing may be utilized to construct an intermediate structure to store lower and upper bound values for each centroid. With the lower and upper bounds computed, some embodiments may advantageously avoid many or most redundant or unnecessary computations and converge very quickly (e.g., as compared to other k-means techniques).

Figure 6:
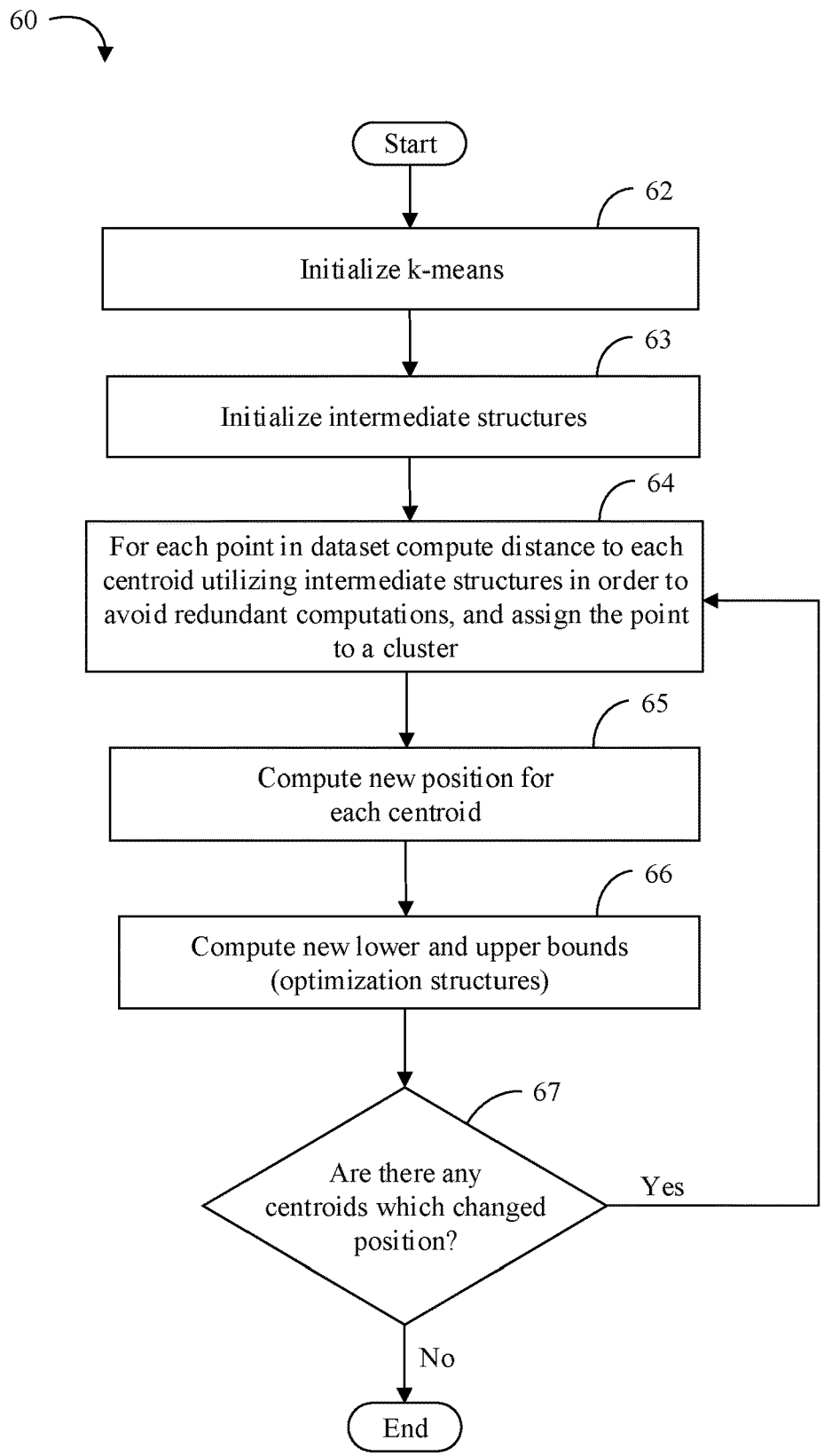
FIG. 6 is a flowchart of an example of a method of an angular k-means technique according to an embodiment.

Turning now to FIG. 6, a method 60 of an angular k-means technique may include initializing the k-means at block 62 (e.g., using any suitable k-means initialization technique such as random, probability-based, etc.), and initializing the intermediate structures at block 63 (e.g., the lower bounds, the upper bounds, etc.). At block 64, for each point in the dataset, the method 60 may include computing the distance from the point to each centroid (e.g., utilizing the intermediate structures to avoid redundant or unnecessary computations), and assigning the point to a cluster. The method 60 may then include computing a new position for each centroid at block 65, and computing new lower and upper bounds at block 66 (e.g., updating the intermediate structures). The method 60 may then include determining if any centroids changed position at block 67. If so, the method may return to block 64. If not, the angular k-means has converged and is complete.

Without being limited to particular implementations, some embodiments may be better understood with respect to example pseudo-code routines. An overall pseudo-code routine to group the dataset into clusters may be referred to as ANGULAR-KMEANS:

```
procedure ANGULAR-KMEANS(X)
    INITIALIZE(X, C, D, l, u, s, upd)
    repeat
        COMPUTE-CENTROID-DISTANCES(C, D, s, upd)
        ASSIGN-CLUSTERS(X, C, D, l, u, s, upd)
        UPDATE(X, C, l, u, upd)
    until converged
``` where X corresponds to a dataset of size n which is being clustered; C corresponds to a vector (array) of size k which contains positions of cluster centroids; D corresponds to a symmetric matrix (2D array) of size k×k which contains distances between each centroid; l corresponds to a matrix (2D array) of size n×k which contains lower bounds for each point in dataset X and each centroid in C; u corresponds to a vector (array) of size n which contains upper bounds for each point in dataset X; s corresponds to a vector (array) of size k which contains for each centroid in C a distance to the closest other centroid; and upd corresponds to a vector (array) of size k which contains a boolean flag for each centroid indicating whether a centroid has changed its position since the last iteration of the algorithm.

The matrix l may be related to distances between points and centroids and triangle inequality. For example, the matrix l may correspond to an approximation or worst-case distance of dataset points to each centroid. The matrix u may also relate to distances between points and centroids and triangle inequality. The matrix l, the matrix u, the matrix D, the vector s, and the vector upd may all be considered as intermediate structures which improve or optimize the angular k-means technique in accordance with some embodiments. The d(x,y) function may correspond to a function which computes the distance between points x and y.

After some initialization steps, the ANGULAR-KMEANS procedure may iteratively compute distances for every dataset point to all the centroids and assigns the points to their nearest centroids. The loop may be repeated until a convergence criteria is met (e.g., the loop may run as long as a flag/function determining that the results have converged is "false"). For example, the convergence may be achieved when no point is assigned to a different cluster than in the previous iteration. The centroid may correspond to a center or average point of the whole cluster.

Without being limited to particular implementations, an initialization pseudo-code routine may be referred to as INITIALIZE:

```
procedure INITIALIZE(X, C, D, l, u, s, upd)
    INITIALIZE-CENTROIDS(X, C)
    COMPUTE-CENTROIDS(X, C)
    ASSIGN-INIT-CLUSTERS(X, C, D, l, u, s)
    UPDATE(X, C, l, u, upd)
```

The INITIALIZE procedure may include centroid initialization and a "zero" iteration of the angular k-means technique (e.g., a compute-assign-update cycle). For example, some embodiments may utilize an initial random assignment or an initial probability-/density-based assignment.

Without being limited to particular implementations, a pseudo-code routine to update some of the intermediate structures may be referred to as COMPUTE-CENTROID-DISTANCES:

```
procedure COMPUTE-CENTROID-DISTANCES(C, D, s, upd)
    for i ← 1, k do
        c1 ← C(i)
        if upd(c1) then
            D(c1, c1) ← 0
            for j ← i+1, k do
                c2 ← C(j)
                dist ← d(c1, c2)
                D(c1, c2) ← dist
                D(c2, c1) ← dist
    for all c1 ∈ C do
        min ← +∞
        for all c2 ∈ C, c2 ≠ c1 do
            if D(c1, c2) < min then
                min ← D(c1, c2)
        s(c1) ← min/2
```

Following execution of the COMPUTE-CENTROID-DISTANCES procedure, the matrix D (e.g., distances between all centroids) and the vector s (e.g., the distance to the closest neighbor centroid for each centroid) are updated.

The first loop (for i←1, k do) may update the matrix with distances between centroids. Advantageously, the upd vector may reduce the number of computations when a centroid has not moved between iterations. This improvement/optimization is especially beneficial when the angular k-means technique is close to convergence and very few centroids change their coordinates (e.g., at the beginning of the technique many centroids may move but near the end fewer centroid may move per iteration). The second loop (for all c2∈ C, c2≠c1 do) may perform a search for the closest centroid for each centroid. The vectors may store half of the closest distance for use in other computations.

Without being limited to particular implementations, a pseudo-code routine to assign points to their initial clusters may be referred to as ASSIGN-INIT-CLUSTERS:

```
procedure ASSIGN-INIT-CLUSTERS(X, C, D, l, u, s)
    for all x ∈ X do
        min ← +∞
        for all c ∈ C do
            l(x, c) ← 0
            if c(x) = null ∨ ½D(c, c(x)) < D(x, c(x)) then
                l(x, c) ← d(x, c)
                if l(x, c) < min then
                    min ← l(x, c)
                    c(x) ← c
        u(x) ← min
```

In some embodiments, the ASSIGN-INIT-CLUSTERS procedure for the first assignment of points to their clusters may also include the initialization of some intermediate structures, such as the lower and upper bounds which are stored in l and u.

The first conditional statement (if c(x)=null ∨ ½D(c, c(x))<D(x, c(x)) then) may filter redundant/unnecessary computations based on distances between two centroids and distance to the current centroid for point x (e.g., based on triangle inequality), advantageously providing a significant performance gain. If the condition holds, the lower bound for a given point x and centroid c may be updated (l(x, c)←d(x, c)). Subsequently, the upper bound for a given point x may be updated (u(x)←min). The ASSIGN-INIT-CLUSTERS procedure may compute distances between all points in the dataset and all the centroids. These values are stored in the l matrix. At the same time, the ASSIGN-INIT-CLUSTERS procedure may find the minimum value of the distance to centroids for each point in dataset and these values may be stored in the u matrix.

Without being limited to particular implementations, a pseudo-code routine to assign points to their subsequent/final clusters may be referred to as ASSIGN-CLUSTERS:

```
procedure ASSIGN-CLUSTERS(X, C, D, l, u, s, upd)
    for all x ∈ X do
        r ← true
        if u(x) > s(c(x)) then
            for all c ∈ C do
                if u(x) > l(x, c) ∧ u(x) > ½ D(c, c(x)) then
                    if r ∧ upd(c(x)) then
                        dist ← d(x, c(x))
                        u(x) ← dist
                        l(x, c) ← dist
                        r ← false
                    if u(x) > l(x, c) ∨ u(x) > ½ D(c, c(x)) then
                        dist ← d(x, c)
                        l(x, c) ← dist
```

```
                if dist < u(x) then
                      c(x) ← c
                      u(x) ← dist
```

The ASSIGN-CLUSTERS procedure may process each point x in X with a 3-step filter in order to avoid redundant/unnecessary distance computation (e.g., based on triangle inequality). For example, the first conditional statement (if $u(x){>}s(c(x))$ then), the second conditional statement (if $u(x){>}l(x, c) \land u(x){>}½ D(c, c(x))$) then), and the fourth conditional statement (if $u(x){>}l(x, c) \lor u(x){>}½ D(c, c(x))$ then), may each filter redundant/unnecessary computations based on triangle inequality.

The boolean variable r may be utilized to indicate that approximations in lower/upper bounds l and u may not be up to date. In that case, the ASSIGN-CLUSTERS procedure may compute up to date distance values and store them. Advantageously, the distance computations are triggered only when the centroid has changed its position in the last iteration or when some new centroid has moved close enough to a given point that the fourth conditional statement holds.

In some other k-means techniques, assigning points to clusters may perform the distance calculation between each point x in X and each centroid C in and find the closest cluster. However, many of these computations are redundant and/or unnecessary. If a point x is currently assigned to a centroid c, intuitively, there is no need for checking distance to some far away centroid c'. Advantageously, the intermediate structures l and u may help define when the centroid c' may be far away by providing appropriate lower and upper bounds. In the case of text documents or other high-dimensional spaces, for example, the distance computation may have the most significant impact on the overall performance of the k-means technique. Advantageously, by reducing or avoiding redundant/unnecessary distance computations, some embodiments may be sped up by a significant factor.

Without being limited to particular implementations, a pseudo-code routine to update centroid positions and some intermediate structures may be referred to as UPDATE:

```
procedure UPDATE(X, C, l, u, upd)
    for all c ∈ C do
        c' ← m(c)
        c ← c'
        mov(c) ← d(c, c')
        if mov(c) ≠ 0 then
            upd(c) ← true
        else
            upd(c) ← false
    for all x ∈ X do
        for all c ∈ C do
            l(x, c) ← max{0, l(x, c) − mov(c)}
            u(x) ← u(x) + mov(c(x))
```

The first loop (for all c∈ C do) may compute a new position for each centroid (e.g., calculate an average of all points in a given cluster). After that the upd vector may be updated (e.g., if the centroid has moved in the iteration, that information may be stored in the vector upd). The second loop (for all x∈ X do) may include updating of lower/upper bounds stored in l and u. The UPDATE procedure may utilize a vector of relative movement of centroids named mov. In the third loop (for all c∈ C do), triangle inequality may be used may be utilized to approximate the new lower bound for each point in X and centroid in C ($l(x, c) \leftarrow \max\{0, l(x, c){-}mov(c)\}$). This approximation may stand until an exact result may be substituted for the approximation (e.g. by the ASSIGN-CLUSTERS procedure).

Some embodiments may advantageously boost and/or optimize various text clustering applications by utilizing angular distance for a distance function. In some embodiments, angular distance may be somewhat related to cosine similarity. Some embodiments may include an angular distance between points x and y which may be described as the angle between points x and y and a vertex in point 0 (e.g., the zero vector in the space). For example, the angular distance $d_a$ between points $x_a$ and $x_b$ in relation to $s_c$ being cosine similarity:

$$d_a(x_a, x_b) = \arccos (s_c(x_a, x_b)) =$$
$$\arccos ((x_a \cdot x_b)/(\|x_a\|_2 \times \|x_b\|_2)) = \arccos (\cos (\theta)) = \theta$$

where $s_c$ corresponds to the cosine similarity, and where the dot character corresponds to an Euclidean dot product (e.g., whereas the x character may be consider a magnitude, norm, or Euclidean norm/length). Accordingly, for a computed cosine similarity, the angular distance may be determined by applying an arccos function to the cosine similarity function. Advantageously, the way the angular distance may be calculated in some embodiments may provide a pseudometric (e.g., a pseudometric space may be a generalized metric space in which the distance between two distinct points can be zero). Accordingly, the angular distance function may be particularly useful for shortcuts described herein which involve triangle inequality because the calculation is true for this function (e.g., based on subadditivity/triangle inequality), as compared to cosine similarity which does not exhibit a psuedometric characteristic.

Text clustering may be an important area of data mining. Text clustering may be considered to reflect how people think, group and classify when reading documents, books, web articles or even advertisement content. Another application of text clustering may include creating search and scoring engines which must be highly optimized in some big data environments. Some embodiments may advantageously cluster text documents utilizing an angular k-means technique, as described herein. Using unit spheres, the angular distance may be applied to measure distance between documents and some embodiments may employ one or more or all of the various intermediate structures described herein to implement a fast version of the angular k-means technique. Some embodiments may be particularly useful for data mining libraries, open-source or closed-source applications, commercial products such as SPARK, MLIB, INTEL ATK, INTEL TAP, or other applications focused on text mining, text classification, tagging systems, recommendation systems, log monitoring, search engines, biomedical text mining, news analytics (includes trading systems), sentiment analytics, test case execution logs, etc.

Some embodiments described herein may include both much better distance calculation performance and also real clock time performance as compared to other k-means techniques. In performance comparisons for the US Census Data 1990 dataset, the REUTERS R52 dataset, and the USENET 20 Newsgroup dataset, some embodiments showed identical results in terms of clustering (e.g., all text documents were grouped into the same sets of clusters) while embodiments of the angular k-means technique showed significantly better performance in terms of both a distance calculation speedup and a real time clock speedup.

Figure 7:
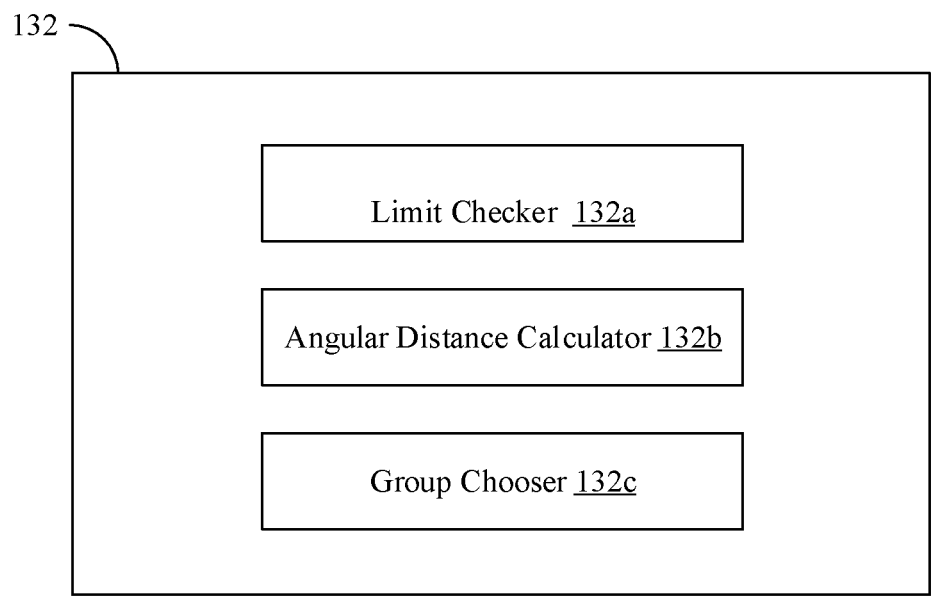
FIGS. 7 and 8 are block diagrams of examples of data grouper apparatuses according to embodiments.

FIG. 7 shows a data grouper apparatus 132 (132a-132c) that may implement one or more aspects of the method 30 (FIGS. 3A to 3C), the method 60 (FIG. 6), and/or the various pseudo-code routines described herein. The data grouper apparatus 132, which may include logic instructions, configurable logic, fixed-functionality hardware logic, may be readily substituted for the logic 13 (FIG. 1), the logic 22 (FIG. 2), or the data grouper 40 (FIG. 4), already discussed. An angular distance calculator 132b may be configured to calculate an angular distance between a data object and a group of data objects. A limit checker 132a may be configured to determine one or more of an upper bound and a lower bound for the group of data objects based on triangle inequality. The limit checker 132a may also be configured to determine if the data object is within the upper and lower bounds for the group of data objects, and advantageously avoid redundant or unnecessary calculations (e.g., the angular distance calculator 132b may calculate the angular distance between the data object and the group of data objects responsive to the data object being determined by the limit checker 132a to be within the upper and lower bounds for the group of data objects. A group chooser 132c may assign the data object to an appropriate group of data objects based on the determined angular distance.

The data grouper apparatus 132 may also maintain a k by k matrix of distances between respective groups of data objects, where k corresponds to a target number of groups of data objects. In some embodiments, the data grouper apparatus 132 may also maintain a n by k matrix of respective lower bounds for each data object and each group of data objects, and maintain an array of size n of respective upper bounds for each data object, where n corresponds to a total number of data objects in a dataset and where k corresponds to a target number of groups of data objects. For example, the dataset may include a set of text documents and the data objects may be individual text documents.

Figure 8:
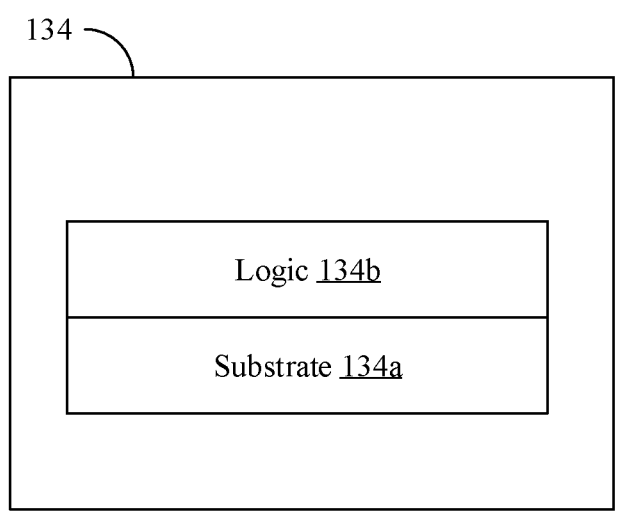

Turning now to FIG. 8, data grouper apparatus 134 (134a, 134b) is shown in which logic 134b (e.g., transistor array and other integrated circuit/IC components) is coupled to a substrate 134a (e.g., silicon, sapphire, gallium arsenide). The logic 134b may generally implement one or more aspects of the method 30 (FIGS. 3A to 3C), the method 60 (FIG. 6), and/or the various pseudo-code routines described herein. Thus, the logic 134b may determine an angular distance between a data object and a group of data objects, and assign the data object to the group of data objects based on the determined angular distance. For example, the logic 134b may determine one or more of an upper bound and a lower bound for the group of data objects based on triangle inequality. In some embodiments, the logic 134b may be further configured to determine if the data object is within the upper and lower bounds for the group of data objects, and determine the angular distance between the data object and the group of data objects responsive to the data object being determined to be within the upper and lower bounds for the group of data objects. The logic 134b may also maintain a k by k matrix of distances between respective groups of data objects, where k corresponds to a target number of groups of data objects. In some embodiments, the logic 134b may also maintain a n by k matrix of respective lower bounds for each data object and each group of data objects, and maintain an array of size n of respective upper bounds for each data object, where n corresponds to a total number of data objects in a dataset and where k corresponds to a target number of groups of data objects. In any of the embodiments herein, the dataset may include a set of text documents. In one example, the apparatus 134 is a semiconductor die, chip and/or package.

Figure 9:
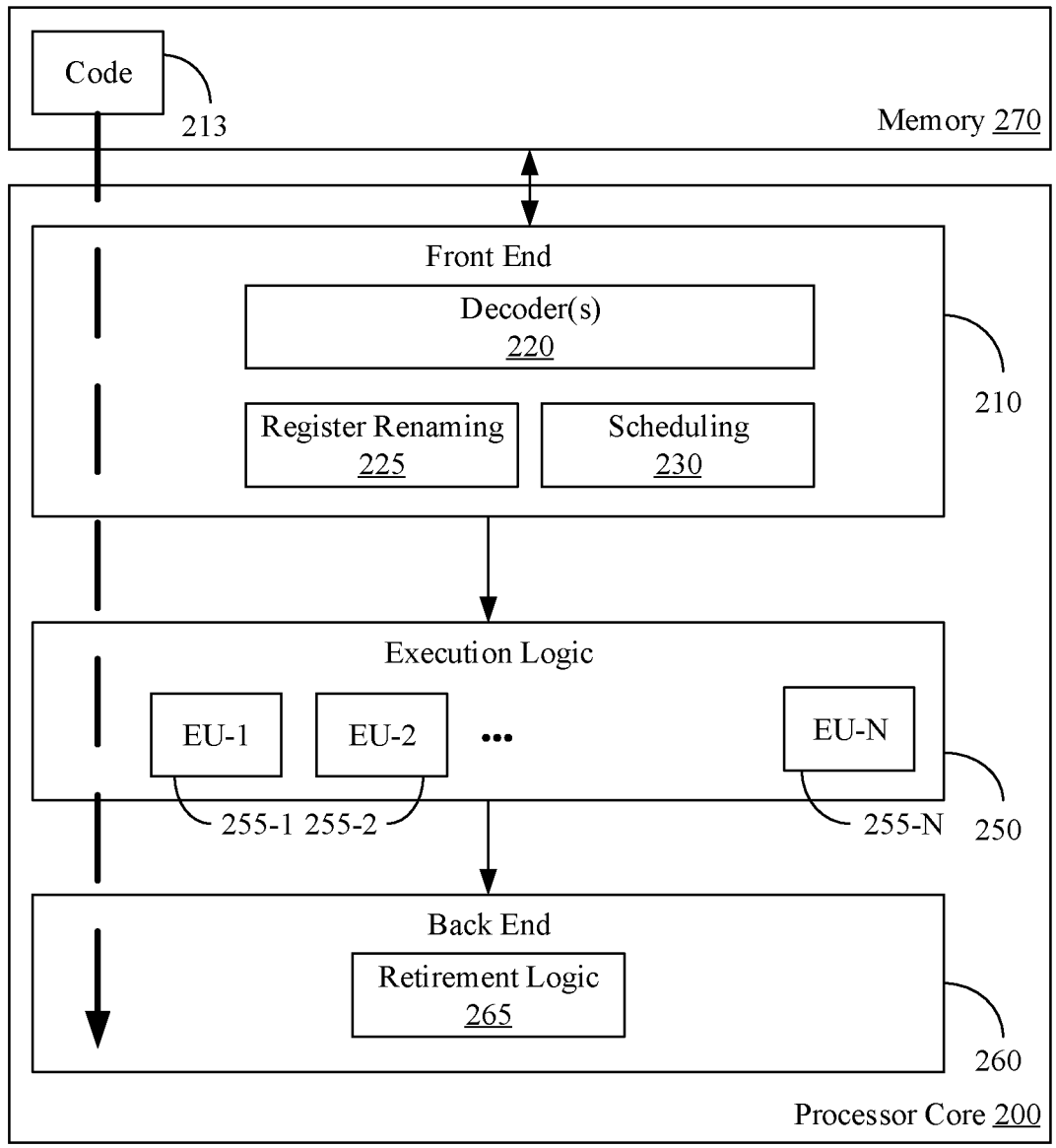
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 30 (FIGS. 3A to 3C), the method 60 (FIG. 6), and/or the various pseudo-code routines described herein, already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200.

The processing element may include I/O control logic and/or may include I/O control logic integrated with memory control logic. The processing element may also include one or more caches.

Figure 10:
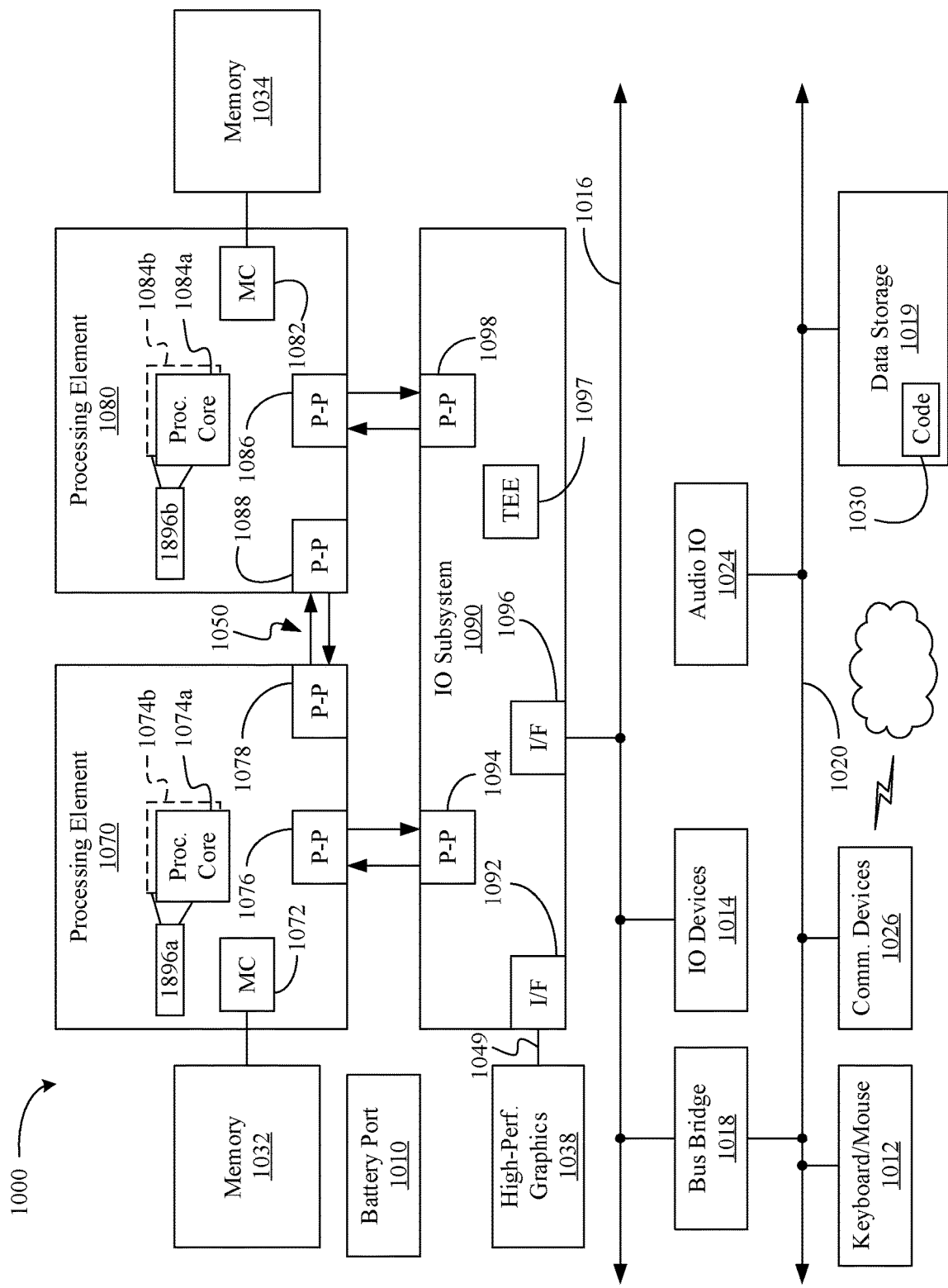
FIG. 10 is a block diagram of an example of a system according to an embodiment.

Referring now to FIG. 10, shown is a block diagram of a system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 9.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes a TEE 1097 (e.g., security controller) and P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement one or more aspects of the method 30 (FIGS. 3A to 3C), the method 60 (FIG. 6), and/or the various pseudo-code routines described herein, already discussed, and may be similar to the code 213 (FIG. 9), already discussed. Further, an audio I/O 1024 may be coupled to second bus 1020.

Note that other embodiments are contemplated. For example, instead of the point-to-point architecture of FIG. 10, a system may implement a multi-drop bus or another such communication topology.

ADDITIONAL NOTES AND EXAMPLES

Example 1 may include an electronic processing system, comprising a processor, memory communicatively coupled to the processor, and logic communicatively coupled to the processor to determine an angular distance between a data object and a group of data objects, and assign the data object to the group of data objects based on the determined angular distance.

Example 2 may include the system of Example 1, wherein the logic is further to determine one or more of an upper bound and a lower bound for the group of data objects based on triangle inequality.

Example 3 may include the system of Example 2, wherein the logic is further to determine if the data object is within the upper and lower bounds for the group of data objects, and determine the angular distance between the data object and the group of data objects responsive to the data object being determined to be within the upper and lower bounds for the group of data objects.

Example 4 may include the system of any of Examples 3, wherein the logic is further to maintain a k by k matrix of distances between respective groups of data objects, where k corresponds to a target number of groups of data objects.

Example 5 may include the system of any of Examples 3 to 4, wherein the logic is further to maintain a n by k matrix of respective lower bounds for each data object and each group of data objects, and maintain an array of size n of respective upper bounds for each data object, where n corresponds to a total number of data objects in a dataset and where k corresponds to a target number of groups of data objects.

Example 6 may include the system of Example 5, wherein the dataset comprises a set of text documents.

Example 7 may include a semiconductor package apparatus, comprising a substrate, and logic coupled to the substrate, wherein the logic is at least partly implemented in one or more of configurable logic and fixed-functionality hardware logic, the logic coupled to the substrate to determine an angular distance between a data object and a group of data objects, and assign the data object to the group of data objects based on the determined angular distance.

Example 8 may include the apparatus of Example 7, wherein the logic is further to determine one or more of an upper bound and a lower bound for the group of data objects based on triangle inequality.

Example 9 may include the apparatus of Example 8, wherein the logic is further to determine if the data object is within the upper and lower bounds for the group of data objects, and determine the angular distance between the data object and the group of data objects responsive to the data object being determined to be within the upper and lower bounds for the group of data objects.

Example 10 may include the apparatus of Example 9, wherein the logic is further to maintain a k by k matrix of distances between respective groups of data objects, where k corresponds to a target number of groups of data objects.

Example 11 may include the apparatus of any of Examples 9 to 10, wherein the logic is further to maintain a n by k matrix of respective lower bounds for each data object and each group of data objects, and maintain an array of size n of respective upper bounds for each data object, where n corresponds to a total number of data objects in a dataset and where k corresponds to a target number of groups of data objects.

Example 12 may include the apparatus of Example 11, wherein the dataset comprises a set of text documents.

Example 13 may include a method of grouping data objects, comprising determining an angular distance between a data object and a group of data objects, and assigning the data object to the group of data objects based on the determined angular distance.

Example 14 may include the method of Example 13, further comprising determining one or more of an upper bound and a lower bound for the group of data objects based on triangle inequality.

Example 15 may include the method of Example 14, further comprising determining if the data object is within the upper and lower bounds for the group of data objects, and determining the angular distance between the data object and the group of data objects responsive to the data object being determined to be within the upper and lower bounds for the group of data objects.

Example 16 may include the method of Example 15, further comprising maintaining a k by k matrix of distances between respective groups of data objects, where k corresponds to a target number of groups of data objects.

Example 17 may include the method of any of Examples 15 to 16, further comprising maintaining a n by k matrix of respective lower bounds for each data object and each group of data objects, and maintaining an array of size n of respective upper bounds for each data object, where n corresponds to a total number of data objects in a dataset and where k corresponds to a target number of groups of data objects.

Example 18 may include the method of Example 17, wherein the dataset comprises a set of text documents.

Example 19 may include at least one computer readable medium, comprising a set of instructions, which when executed by a computing device, cause the computing device to determine an angular distance between a data object and a group of data objects, and assign the data object to the group of data objects based on the determined angular distance.

Example 20 may include the at least one computer readable medium of Example 19, comprising a further set of instructions, which when executed by the computing device, cause the computing device to determine one or more of an upper bound and a lower bound for the group of data objects based on triangle inequality.

Example 21 may include the at least one computer readable medium of Example 20, comprising a further set of instructions, which when executed by the computing device, cause the computing device to determine if the data object is within the upper and lower bounds for the group of data objects, and determine the angular distance between the data object and the group of data objects responsive to the data object being determined to be within the upper and lower bounds for the group of data objects.

Example 22 may include the at least one computer readable medium of Example 21, comprising a further set of instructions, which when executed by the computing device, cause the computing device to maintain a k by k matrix of distances between respective groups of data objects, where k corresponds to a target number of groups of data objects.

Example 23 may include the at least one computer readable medium of any of Examples 21 to 22, comprising a further set of instructions, which when executed by the computing device, cause the computing device to maintain a n by k matrix of respective lower bounds for each data object and each group of data objects, and maintain an array of size n of respective upper bounds for each data object, where n corresponds to a total number of data objects in a dataset and where k corresponds to a target number of groups of data objects.

Example 24 may include the at least one computer readable medium of Example 23, wherein the dataset comprises a set of text documents.

Example 25 may include a data grouper apparatus, comprising means for determining an angular distance between a data object and a group of data objects, and means for assigning the data object to the group of data objects based on the determined angular distance.

Example 26 may include the apparatus of Example 25, further comprising means for determining one or more of an upper bound and a lower bound for the group of data objects based on triangle inequality.

Example 27 may include the apparatus of Example 26, further comprising means for determining if the data object is within the upper and lower bounds for the group of data objects, and means for determining the angular distance between the data object and the group of data objects responsive to the data object being determined to be within the upper and lower bounds for the group of data objects.

Example 28 may include the apparatus of Example 27, further comprising means for maintaining a k by k matrix of distances between respective groups of data objects, where k corresponds to a target number of groups of data objects.

Example 29 may include the apparatus of any of Examples 27 to 28, further comprising means for maintaining a n by k matrix of respective lower bounds for each data object and each group of data objects, and means for maintaining an array of size n of respective upper bounds for each data object, where n corresponds to a total number of data objects in a dataset and where k corresponds to a target number of groups of data objects.

Example 30 may include the apparatus of Example 29, wherein the dataset comprises a set of text documents.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. An electronic processing system, comprising:
a processor;
memory communicatively coupled to the processor; and
logic communicatively coupled to the processor to:
    identify a dataset of N data objects,
    identify K centroids,
    determine an angular distance between a first data object of the data objects and a first centroid of the centroids,
    assign the first data object to the first centroid based on the determined angular distance,
    generate a N by K matrix of respective lower bounds, for each data object of the data objects and each centroid of the centroids, based on a triangle inequality, and
    generate an array of size N of respective upper bounds for each data object of the data objects based on the triangle inequality.

2. The system of claim 1, wherein the logic is further to:
determine if a second data object is within an upper bound and a lower bound of the lower bounds associated with the first centroid; and
determine the angular distance between the second data object and the first centroid responsive to the second data object being determined to be within the upper and lower bounds associated with the first centroid.

3. The system of claim 1, wherein the logic is further to:
maintain a K by K matrix of distances between the centroids.

4. The system of claim 1, wherein the dataset comprises a set of text documents.

5. A semiconductor package apparatus, comprising:
a substrate; and
logic coupled to the substrate, wherein the logic is at least partly implemented in one or more of configurable logic or fixed-functionality logic hardware, the logic coupled to the substrate to:
    identify a dataset of N data objects,
    identify K centroids,
    determine an angular distance between a first data object of the data objects and a first centroid of the centroids,
    assign the first data object to the first centroid based on the determined angular distance,
    generate a N by K matrix of respective lower bounds, for each data object of the data objects and each centroid of the centroids, based on a triangle inequality, and
    generate an array of size N of respective upper bounds for each data object of the data objects based on the triangle inequality.

6. The apparatus of claim 5, wherein the logic is further to:
 determine if a second data object is within an upper bound and a lower bound of the lower bounds associated with the first centroid; and
 determine the angular distance between the second data object and the first centroid responsive to the second data object being determined to be within the upper and lower bounds associated with the first centroid.

7. The apparatus of claim 5, wherein the logic is further to:
 maintain a K by K matrix of distances between the centroids.

8. The apparatus of claim 5, wherein the dataset comprises a set of text documents.

9. A method of grouping data objects, comprising:
 identifying a dataset of N data objects;
 identifying K centroids;
 determining an angular distance between a first data object of the data objects and a first centroid of the centroids;
 assigning the first data object to the first centroid based on the determined angular distance;
 generating a N by K matrix of respective lower bounds, for each data object of the data objects and each centroid of the centroids, based on a triangle inequality; and
 generating an array of size N of respective upper bounds for each data object of the data objects based on the triangle inequality.

10. The method of claim 9, further comprising:
 determining if a second data object is within an upper bound and a lower bound of the lower bounds associated with the first centroid; and
 determining the angular distance between the second data object and the first centroid responsive to the second data object being determined to be within the upper and lower bounds associated with the first centroid.

11. The method of claim 9, further comprising:
 maintaining a K by K matrix of distances between the centroids.

12. The method of claim 9, wherein the dataset comprises a set of text documents.

13. At least one non-transitory computer readable medium, comprising a set of instructions, which when executed by a computing device, cause the computing device to:
 identify a dataset of N data objects;
 identify K centroids;
 determine an angular distance between a first data object of the data objects and first centroid of the centroids;
 assign the first data object to the first centroid based on the determined angular distance;
 generate a N by K matrix of respective lower bounds, for each data object of the data objects and each centroid of the centroids, based on a triangle inequality; and
 generate an array of size N of respective upper bounds for each data object of the data objects based on the triangle inequality.

14. The at least one non-transitory computer readable medium of claim 13, comprising a further set of instructions, which when executed by the computing device, cause the computing device to:
 determine if a second data object is within an upper bounds and a lower bound of the lower bounds associated with the first centroid; and
 determine the angular distance between the second data object and the first centroid responsive to the second data object being determined to be within the upper and lower bounds associated with the first centroid.

15. The at least one non-transitory computer readable medium of claim 13, comprising a further set of instructions, which when executed by the computing device, cause the computing device to:
 maintain a K by K matrix of distances between the centroids.

16. The at least one non-transitory computer readable medium of claim 13, wherein the dataset comprises a set of text documents.

* * * * *

UNITED STATES PATENT AND TRADEMARK OFFICE
CERTIFICATE OF CORRECTION

Page 1 of 1

PATENT NO.      : 11,030,231 B2
APPLICATION NO. : 15/699236
DATED           : June 8, 2021
INVENTOR(S)     : Piotr Tylenda et al.

It is certified that error appears in the above-identified patent and that said Letters Patent is hereby corrected as shown below:

In the Claims

At Column 20, Claim number 14, Line numbers 24-25, delete "upper bounds" and insert --upper bound--

Signed and Sealed this
Fourteenth Day of September, 2021

Drew Hirshfeld
*Performing the Functions and Duties of the
Under Secretary of Commerce for Intellectual Property and
Director of the United States Patent and Trademark Office*